July 17, 1962  O. THIEL  3,044,367
DOUBLE END TUBE DEBURRING MACHINE
Filed April 14, 1958  9 Sheets-Sheet 1

INVENTOR.
OTTO THIEL
BY Whittemore Hulbert
Belknap
ATTORNEYS

July 17, 1962  O. THIEL  3,044,367
DOUBLE END TUBE DEBURRING MACHINE
Filed April 14, 1958  9 Sheets-Sheet 3

INVENTOR.
OTTO THIEL
BY Whittemore Hulbert
Belknap
ATTORNEYS

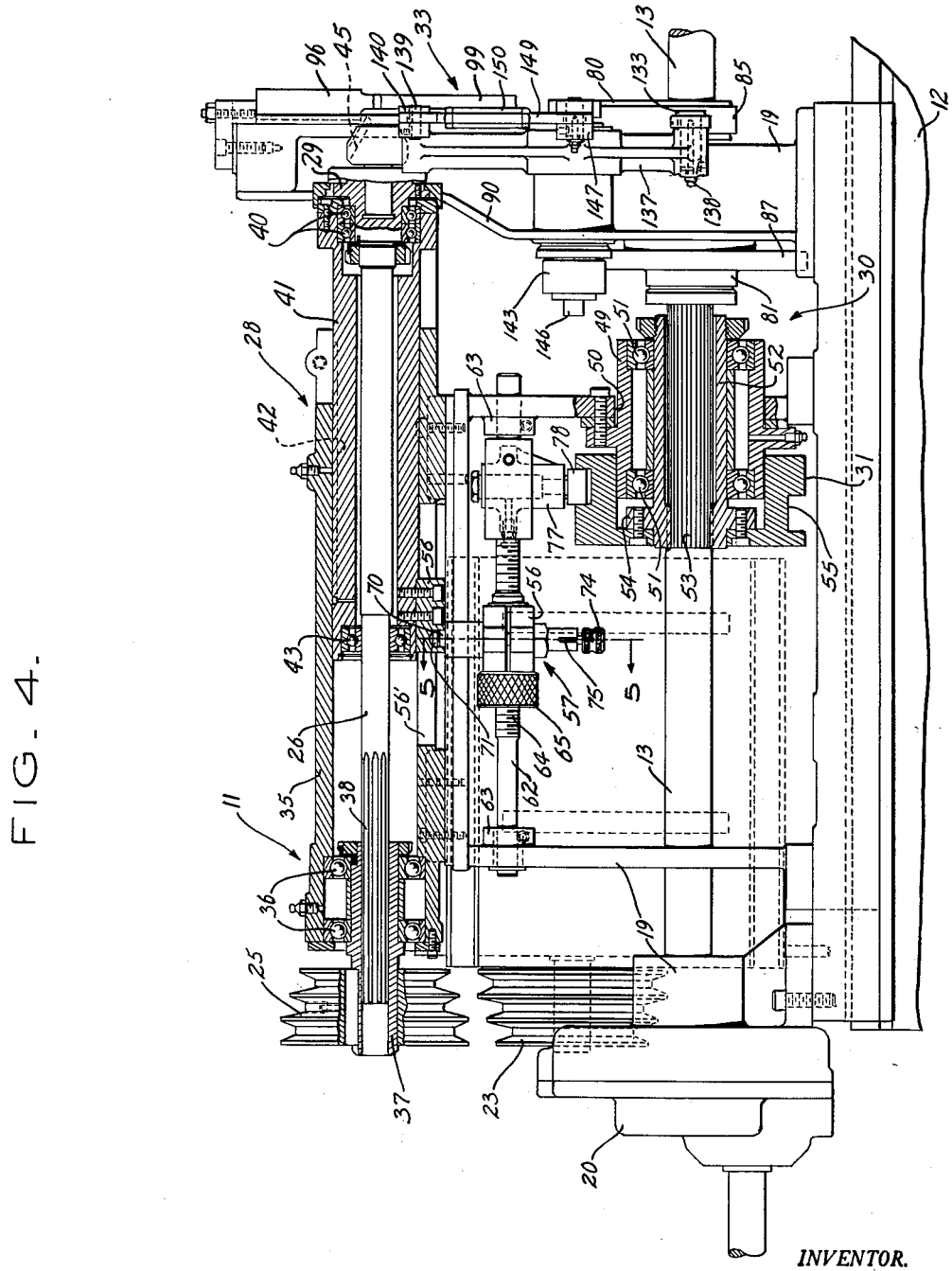

July 17, 1962
O. THIEL
3,044,367
DOUBLE END TUBE DEBURRING MACHINE
Filed April 14, 1958
9 Sheets-Sheet 5
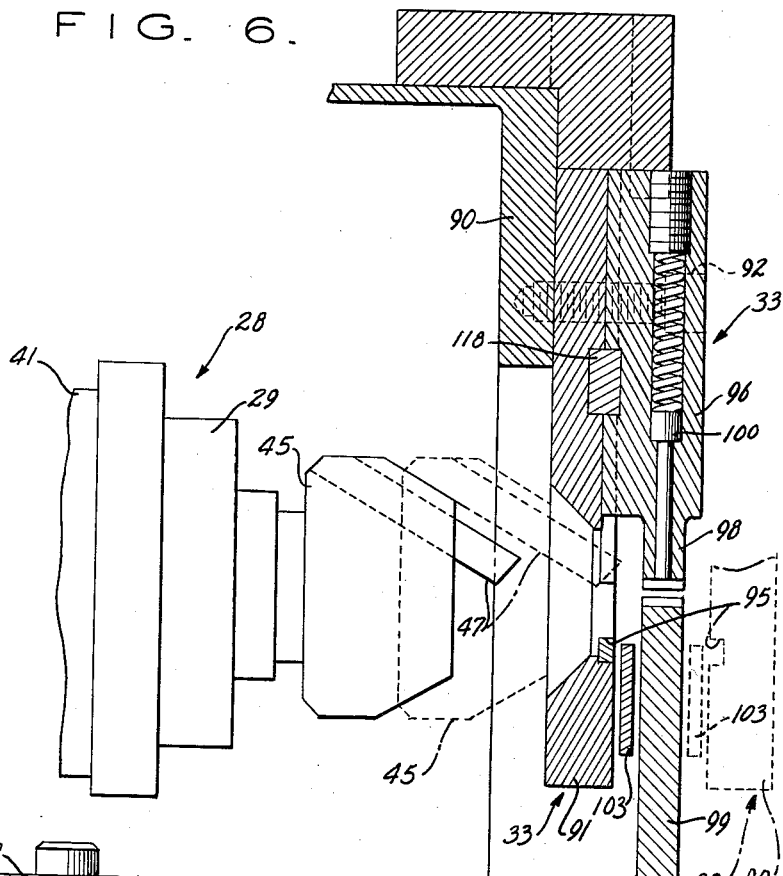
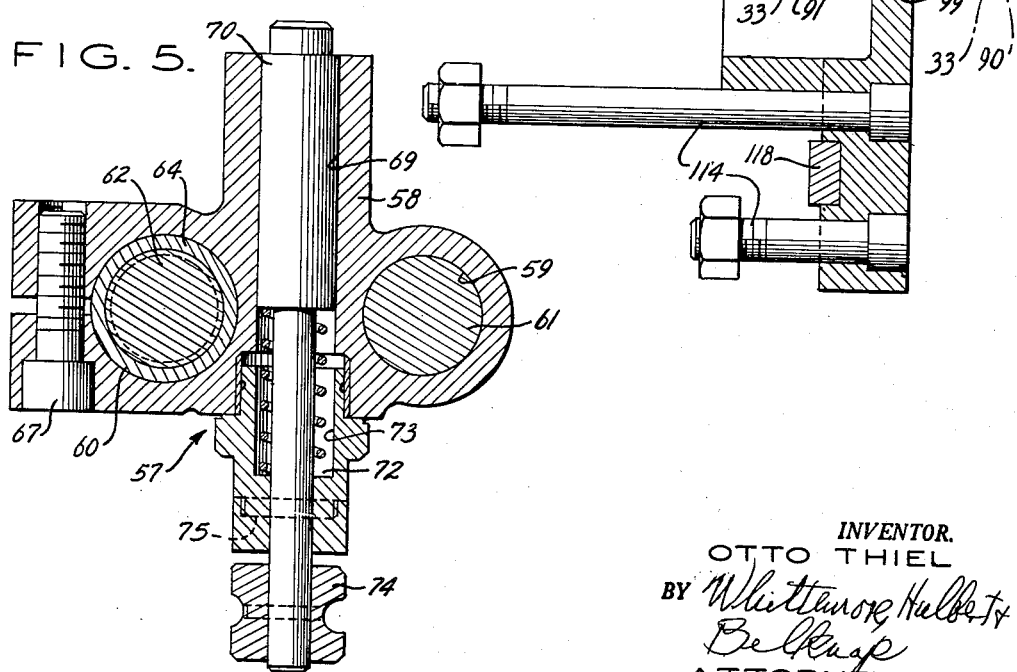
INVENTOR.
OTTO THIEL
BY *Whittemore Hulbert*
*Belknap*
ATTORNEYS July 17, 1962 O. THIEL 3,044,367
DOUBLE END TUBE DEBURRING MACHINE
Filed April 14, 1958 9 Sheets-Sheet 6

INVENTOR.
OTTO THIEL
BY
ATTORNEYS

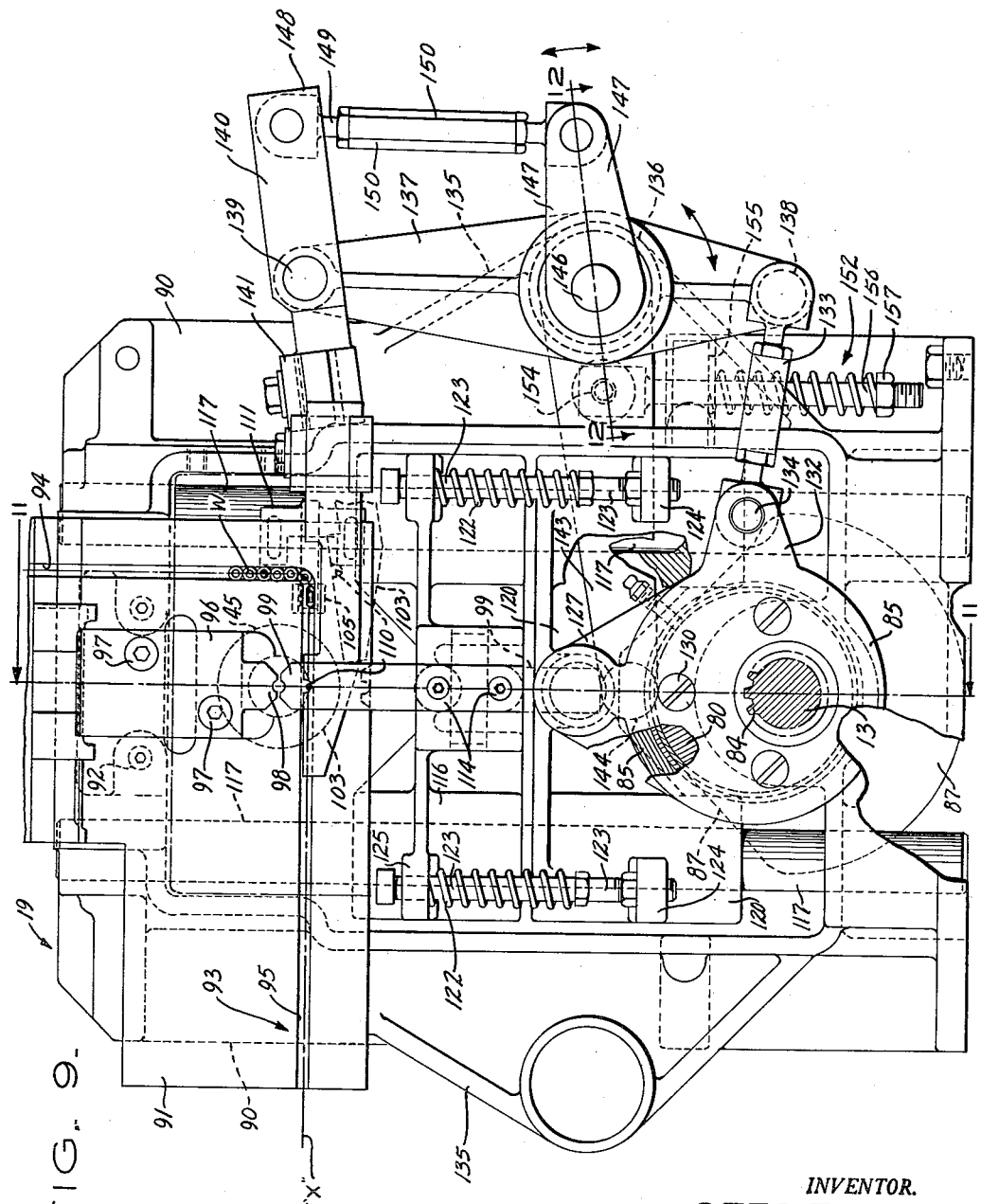

July 17, 1962 O. THIEL 3,044,367
DOUBLE END TUBE DEBURRING MACHINE
Filed April 14, 1958 9 Sheets-Sheet 8

INVENTOR.
OTTO THIEL
BY *Whittemore, Hulbert*
*Belknap*
ATTORNEYS

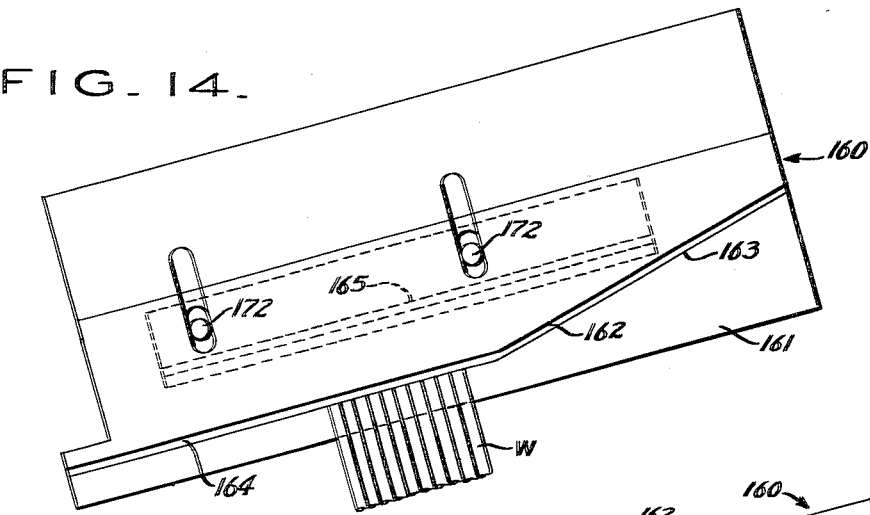
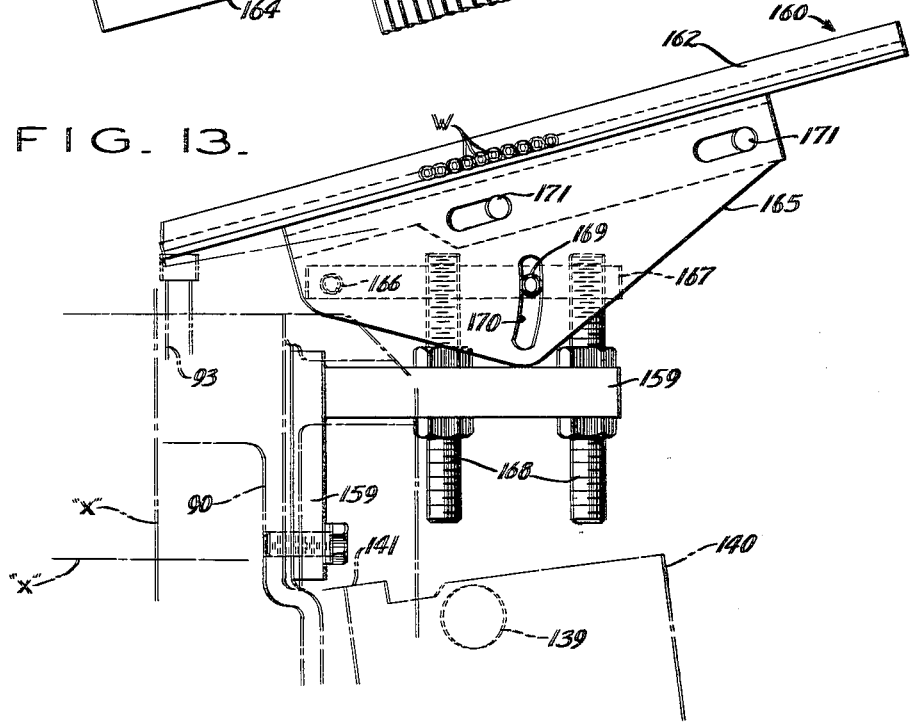

United States Patent Office 3,044,367
Patented July 17, 1962

3,044,367
DOUBLE END TUBE DEBURRING MACHINE
Otto Thiel, Detroit, Mich., assignor to Midwest Supply and Manufacturing Company, Ferndale, Mich., a corporation of Michigan
Filed Apr. 14, 1958, Ser. No. 728,252
15 Claims. (Cl. 90—14)

The present invention relates to a machine of high speed and output capacity for deburring or otherwise finishing the opposite ends of lengths of rod stock or tubing by a simultaneous turning of those ends.

It is an object of the invention to provide a double end tube deburring machine of this type which is of great simplicity, economy and compactness in point of design, in that a single splined drive shaft, powered by an electric motor and suitable shaft driving connections, operates a number of tool and work feed units, in each of the two like sections of the machine. These units include eccentric and cam operated subassemblies by which work holding jaws or clamps are moved into and out of work holding position, by which work advancing arms or jaws are given special oscillatory motions to present work pieces to the clamps, and by which opposed, chuck equipped tool spindles are axially advanced to and from the work, although rotatably driven by independent sources.

Another object is to provide a double end machine of this type, incorporating eccentric and cam type driving and control provisions of the nature referred to, in which a single eccentric, with its associated eccentric ring and linkage, is employed to produce relative approaching and retracting movement of a pair of fixed and movable work clamping members of each of two sections of the machine, as well as to govern one of the components of an oscillatory compound movement of a work transporting and presenting device of each section, by which work pieces are positioned between the movable jaw and fixed anvil type work clamps.

A still further object is to provide a machine having an eccentric arrangement as described, together with cam provisions driven from a common main shaft for completing the special compound oscillatory movement of the work presenting devices.

Yet another object is to provide a machine as described, in which elongated work pieces are gripped adjacent the ends thereof under a resilient clamping force for the performance of turning operations on those ends by axially aligned tools.

A still further object is to provide, in a combination of the above sort, an arrangement in which oppositely acting, axially aligned rotary tools are driven in their axial motions to engage and disengage a work piece by means of rotary cams which receive their drive from the common main drive shaft of the machine.

A further specific object in this connection is to provide an accurately adjustable and releasable pin type of cam follower connection by which the respective rotary tools are connected for reciprocation by the shaft driven cams. This enables an accurate vernier adjustment of the spindles and associated chuck-held tools relative to the opposite ends of the work pieces which are to be machined.

A still further specific object is to provide a machine of the class described in which improved gravity feed chutes of the two opposed, like sections of the machine coact with oscillatory type mechanical feed devices in obtaining a properly timed presentation of work pieces for gripping engagement by opposed jaws. Provision is made for the use of interchangeable guide plates in association with the chutes to enable the provision of different chute throat dimensions for work pieces of different diameter; and the oscillatory feed devices are also adapted to be equipped with interchangeable work presenting jaws or arms of different size or design for handling work pieces of different radius.

The foregoing as well as other objects will become more apparent as this description proceeds, especially when considered in connection with the accompanying drawings illustrating preferred embodiments of the invention, wherein:

FIG. 4 is a fragmentary view of this section, being in side elevation and in part sectioned vertically along a line corresponding to the line 4—4 of FIGS. 2 and 3;

FIG. 5 is a view in enlarged scale in vertical section along line 5—5 of FIG. 4;

FIG. 6 is a schematic side elevational view, also in enlarged scale, showing the general relationship of the tool holder and work clamping components, in a minimum axial spacing of the two opposed machine sections or units which appear in FIGS. 1 and 2, components of the respective sections being depicted in solid and dotted line;

FIG. 9 is a view in vertical transverse section, along line 9—9 of FIG. 1, of work presenting means and cam and eccentric operating linkages therefor associated with one of the two like machine units, different positions of an associated presenting arm or jaw being shown in solid and dotted line;

Figure 11:
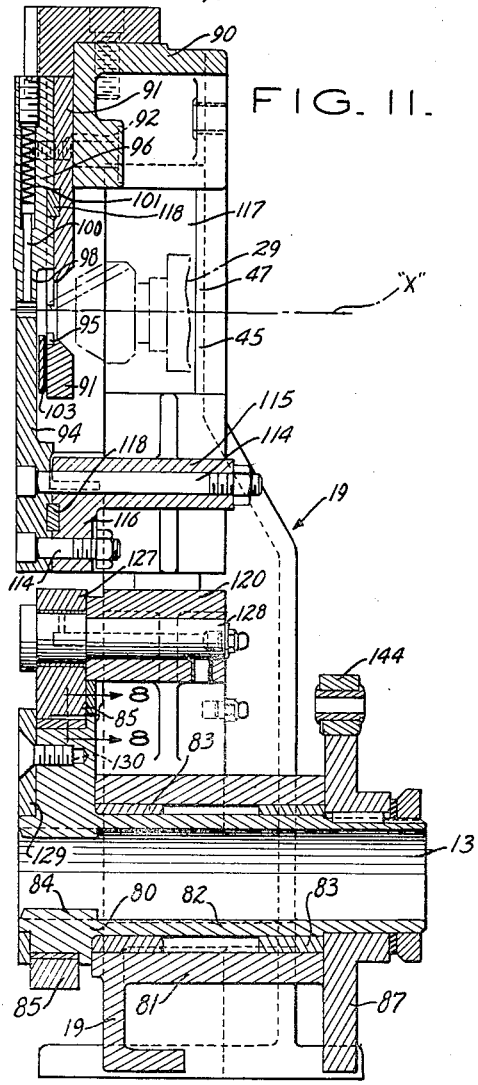
Figure 12:
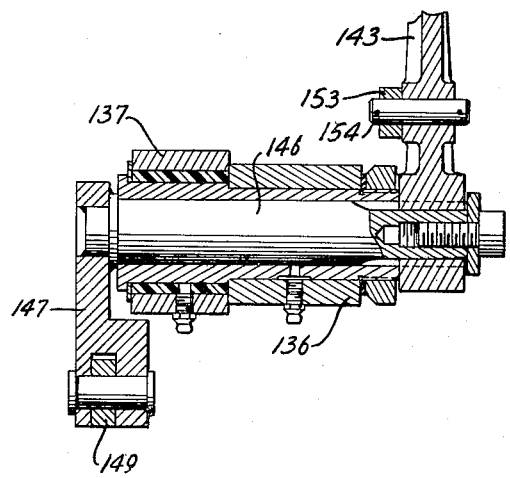

FIGS. 11 and 12 are views in vertical section along lines 11—11 and 12—12, respectively, of FIG. 9;

FIG. 13 is a fragmentary view in end elevation of an adjustable work supply device, one of which is associated with each of the two like sections of the machine; and FIG. 14 is a top plan view of the device of FIG. 13.

Figure 1:
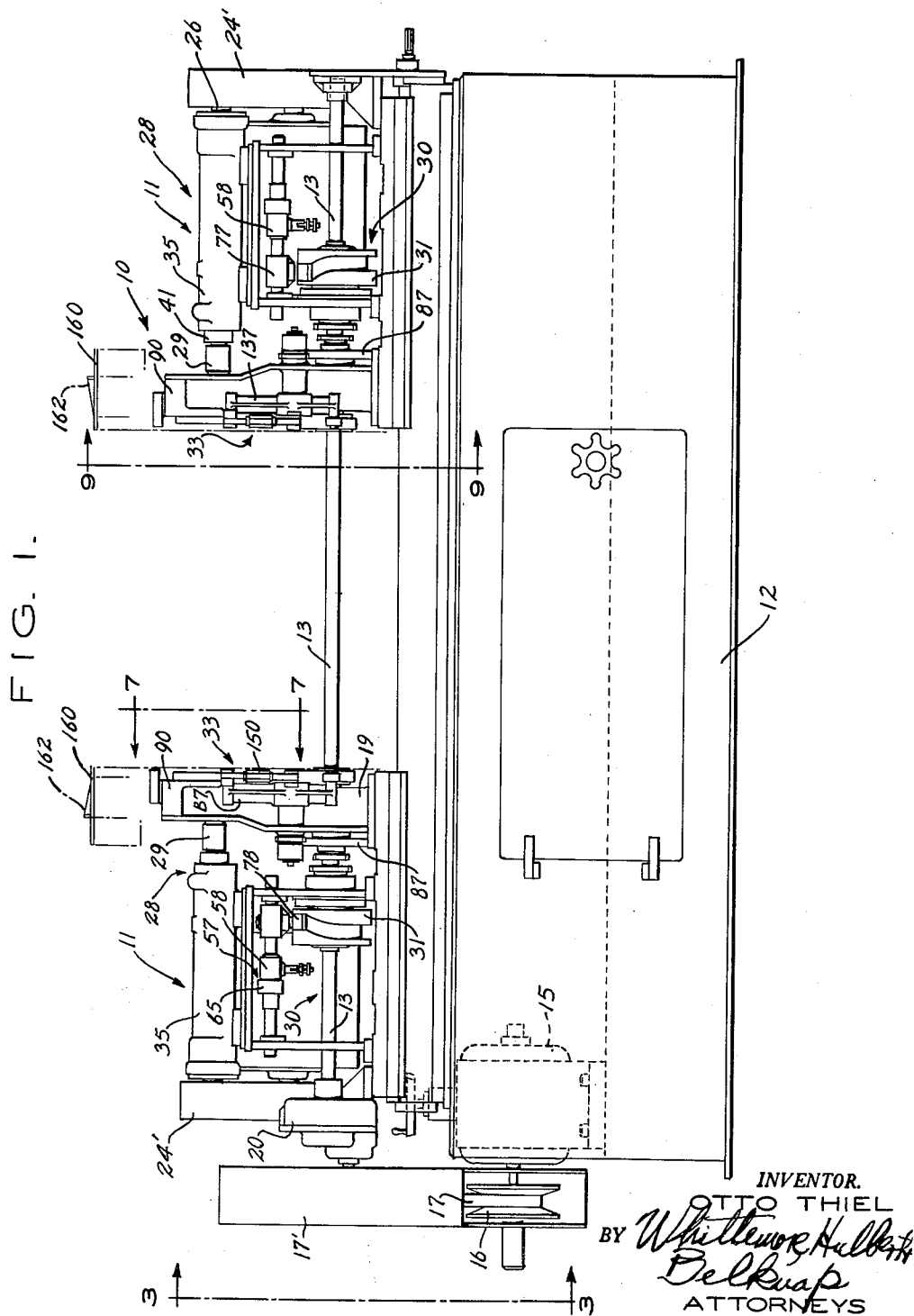
FIG. 1 is a view in front elevation of a deburring machine in accordance with the invention, illustrating the like nature of its pair of opposed work handling and tool operating sections.
Figure 2:
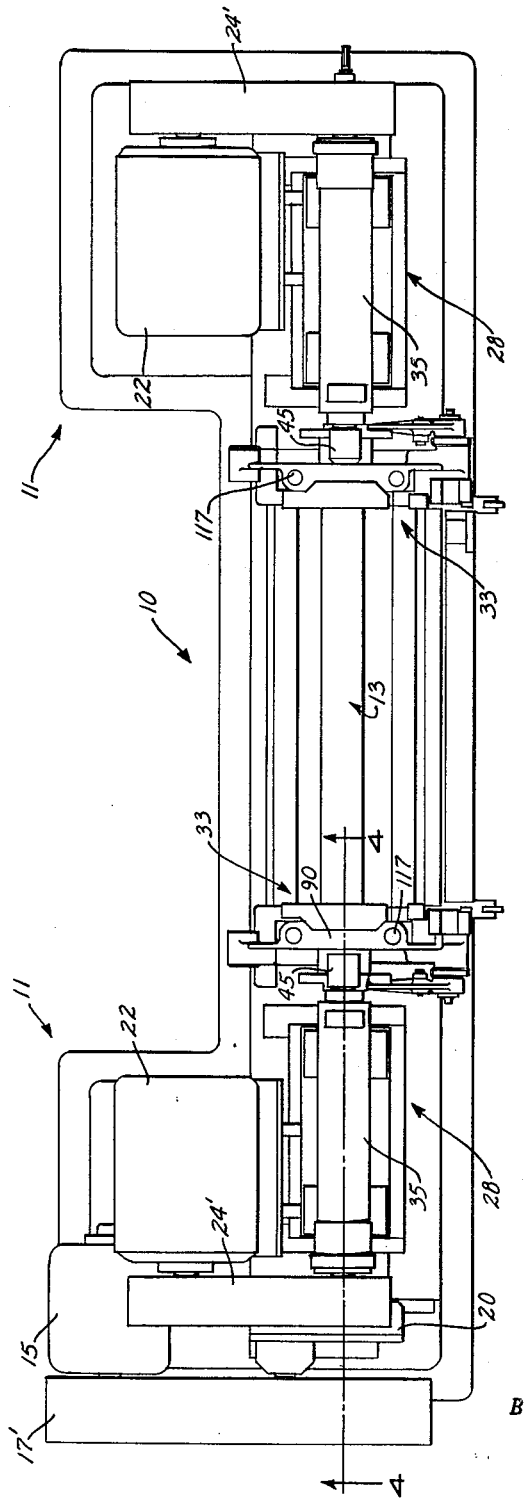
FIG. 2 is a top plan view of the machine of FIG. 1.
Figure 3:
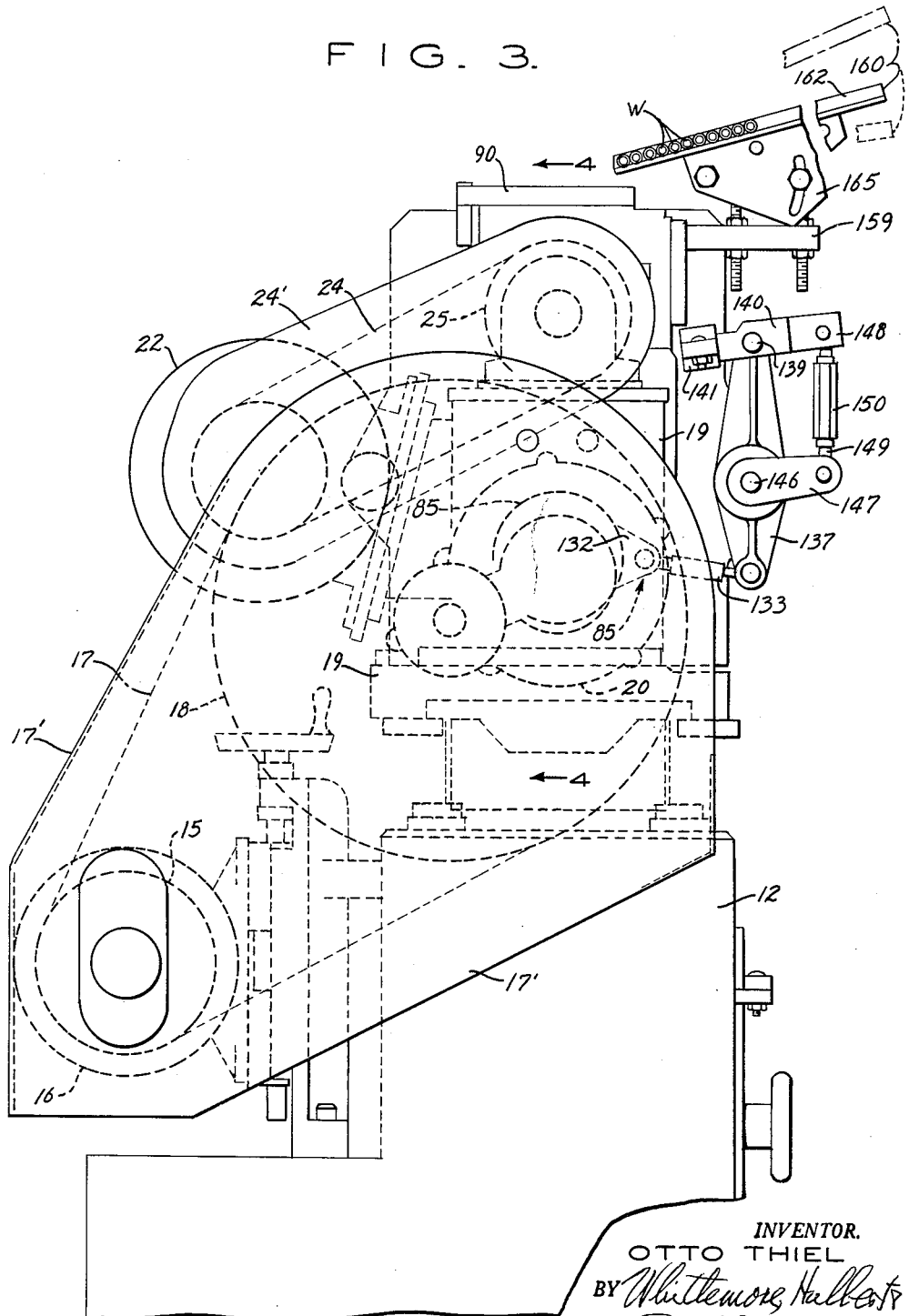
FIG. 3 is an enlarged fragmentary view of the lefthand section of the machine, as viewed from the line 3—3 of FIG. 1.

Referring first to FIGS. 1, 2 and 3 of the drawings, the improved double end tube deburring machine of the invention is generally designated by the reference numeral 10; and it is the function of this machine, through the operation of its two like and axially aligned work feeding and tool operating units or sections 11, to perform automatically and simultaneously a turning type of deburring or like machining operation on the ends of a work piece of tubular stock.

The machine 10 is mounted on a suitable rugged base 12, and practically all of the operations of both of the sections 11 thereof receive their driving power from a single elongated, main drive spline shaft 13 which extends from end to end of the machine, being suitably journaled in an upper frame or superstructure to be described. To drive shaft 13 an electric motor 15 of suitable rating is mounted on a base 12, having a pulley 16 on its shaft, and a belt 17 is trained about this pulley to drive a further pulley 18 of large diameter. Pulley 18 is suitably journaled in a rugged cast or forged superstructure 19 of the lefthand machine unit 11 in question. A similar frame or superstructure is found in the opposed unit. A safety shield 17' houses the pulleys and belting. A speed change device 20 is driven by pulley 18 and has its output drivingly connected direct to an adjacent end of the machine shaft 13.

As an individual drive for the tool spindle (to be described) of the machine section or unit 11 in question, a further electric driving motor 22 of appropriate rating is also suitably mounted on its superstructure 19, in elevated relation to the motor 15, and a multiple step pulley 23 is fixed to the shaft of motor 22, whereby a flexible belt 24 may be drivingly connected in various speed ratios with a stepped driven pulley 25. Pulley 25 is drivingly connected to an adjacent splined end of an elongated tool spindle 26 of the machine section 11. A further safety shield 24' houses this belt and pulley arrangement.

It is to be understood that the corresponding machine unit or section 11 at the opposite or right-hand end of the machine, as viewed in FIGS. 1 and 2, is identically equipped with corresponding, and correspondingly designated, motor and pulley driving provisions for its tool spindle. It is also to be understood that in other respects these two units or sections 11 duplicate one another, so that the description of the features of but one thereof will here suffice.

Further, it is to be emphasized that, other than in their own independent spindle driving provisions, the units 11 have a common drive of all of their operating and control parts from shaft 13, as the latter is powered by the motor 15, belting and speed reducer means referred to above.

The unit 11 is composed, in general, of a rotary tool spindle sub-assembly 28, including a suitable tool holding chuck 29 on the end of the spindle 26 remote from pulley 25; a spindle reciprocating cam sub-assembly 30, including a spindle feed cam 31 driven by spline shaft 13 to produce axial work engaging and disengaging strokes of the chuck 29; and a work presenting and clamping sub-assembly, generally designated 33, located at the inner end of the machine unit or section 11, i.e., remote from its pulley drive means. Sub-assembly 33 includes the various eccentric and cam actuated linkage provisions referred to above. These sub-assemblies will be now detailed in the order of their mention.

Referring to FIG. 4, the spindle sub-assembly 28 includes an elongated cylindrical housing 35 bolted to the top of the superstructure 19 and provided with roller bearings 36 at its end adjacent pulley 25 which rotatably journal an elongated sleeve or bushing 37, in which the splined rear end 38 of the spindle 26 has non-rotative but axially slidable engagement.

The chuck 29 is suitably fixed on the opposite or right-hand end of spindle 26. Chuck 29 is rotatably journaled by ball bearings 40 in an enlarged inner nose portion of an elongated guide sleeve 41, which has an axially sliding fit in the cylindrical bore of housing 35 and has an oil groove 42 extending lengthwise thereof. Sleeve 41 is held against rotation relative to the housing by means to be described. Suitable provision is made to prevent end play at both of the sets of roller bearings 36 and 40; and the spindle 26, and sleeve 41 have axial movement relative to housing 35.

Spindle 26 is journaled intermediate its ends in the guide sleeve 41 through the agency of a roller bearing 43, and suitable lubricating means are provided, of a conventional nature, as at other parts of the machine not justifying individual mention. Thus, the sleeve 41 may be axially reciprocated within the housing 35, to correspondingly shift the spindle 26, the latter being positively rotated unidirectionally through its splined sliding connection at 38 to pulley 25 during this reciprocation.

The spindle chuck 29 releasably receives a suitable deburring type tool head 45 of the general character shown in FIG. 6, including a radially and axially inclined turning tool 47, which is advanced and retracted between the solid and dotted line positions of FIG. 6 in engaging and disengaging the tool with the end of the clamped work. As arranged in FIG. 6, the tool 47 performs a tapering or filleting operation on the inner peripheral end edge of a work piece. If it is desired, a further, oppositely or outwardly inclined tool may be associated with the same head 45 in order to perform a similar deburring operation on both the outer and inner peripheral end edges.

Referring again to FIG. 4, the tool spindle reciprocating sub-assembly 30 includes, in addition to the rotary cam 31, a cylindrical bearing housing 49. Housing 49 is bolted to a portion of the superstructure 19 which is apertured at 50 concentrically of the main shaft 13 to receive it. Ball bearings 51 journal within the housing 49 a tubular driving shaft 52 which is drivingly connected to the main shaft 13 by the intermediate teeth or splines 53. The driving shaft 52 is circumferentially flanged at 54 to provide for a bolted or pinned driving connection thereto of the cam 31, in a concentric relation.

Cam 31 has a peripherally continuous cam groove 55 extending therearound, with appropriate high and low zones to determine the reciprocating movements of tool spindle 26, and its guide sleeve 41, as driven axially by cam 31. To this end, the guide sleeve 41 has a depending driving block 56 bolted thereto adjacent its outer or rear end, preferably beneath the intermediate spindle bearing 43. Block 56 is slidingly received in a slot 56' along the bottom of housing 35, thus restraining guide sleeve 41 against rotation; and the block is releasably engageable by a driving pin or cam coupling unit, generally designated 57, having a vernier type adjustment.

As shown in FIG. 5, the unit 57 comprises a guide member 58 having laterally spaced horizontal bores 59, 60 through which the parallel guide rods 61, 62 respectively extend. Opposed ends of the rods 61, 62 are slidably received in the bores of guide bosses 63 in two upright parts of the superstructure 19. The guide rod 61 is smooth surfaced, but the other rod 62 has a threaded intermediate portion 64, which is threadedly engaged by a knurled nut 65. The nut 65 is rotatable relative to the guide 58, but is held in axially fixed relation thereto, so that upon rotation of nut 65 the guide 58 is shifted axially in one direction or the other, depending upon the direction of rotation. It may be fixedly clamped to the rod 62 in such adjusted position by manipulation of a set screw 67 engaging a split portion of the guide member 58 in which the rod bore 60 is formed.

Referring to FIG. 5, the member 58 also has a vertical bore 69 slidably receiving a coupling pin 70, which is engageable in a mating, downwardly opening recess 71 in the block 56 on spindle guide sleeve 41. A coil spring 72 encircles a reduced portion of the pin 70, acting axially between the latter and the base of a counterbore 73 which receives the spring. The reduced portion of the pin extends downwardly beneath the guide member 58, and has a finger piece 74 fixed thereon.

Accordingly, in any axial position of adjustment of the guide member 58 on guide rods 61, as determined by manipulation of nut 65, the coupling pin 71 may be drivingly disengaged from the sleeve driving block 56 by pulling downwardly on the finger piece 74. It has a pin and slot connection at 75 in the lower end of the yoke 58, so that upon a partial rotation of the thus retracted pin, the latter will be held disengaged for any desired further endwise adjustment.

A sleeve driving yoke 77 is fixed on the guide rods 61 adjacent the inner end of the latter, this yoke carrying a depending cam follower roller 78 which runs in the groove 55 of cam 31. It is thus seen that the spindle mounting and driving sub-assemblies 28, 30, respectively, afford a calibrated adjustment of the spindle guide sleeve 41 relative to the driving cam 31, so that the stroke of the tool chuck 29 may be accurately set. If desired, such settings may be calibrated for turning operations on different lengths of work pieces.

Reference should be made to FIGS. 7 through 13, in conjunction with FIGS. 1 and 2, for structure of the work presenting and holding sub-assembly 33 of the two like machine units 11.

As best shown in FIGS. 9 through 12, the main spline shaft 13 has an eccentric 80 fixed thereon, which is journaled in an end sleeve or boss portion 81 of the machine superstructure 19, i.e., at the right of the latter as viewed in FIG. 4. For this purpose the eccentric 80 may be provided with an elongated hub 82 journaled in boss 81 by bushings 83. The eccentric is keyed or splined at 84 to the inner end of main drive shaft 13, and an eccentric ring 85 surrounds the annular surface of eccentric 80, the dual functions of which ring being hereinafter described.

Shaft 13 has a suitably shaped cam 87 keyed for rotation therewith on the side of the adjacent superstructure opposite eccentric 80, and the eccentric 80 and cam 87 control a compound type of oscillatory rocking movement of a device (hereinafter described) for the presentation of work pieces for the turning of their ends by the opposed tools 47 of the machine units 11. The eccentric 80 has the further function of controlling relative vertical movement of a pair of fixed and movable jaws, between which the work piece is clamped for such operation. Prior to a description of this eccentric and cam operating means, a description of the work presenting and holding structure is in order.

Figure 8:
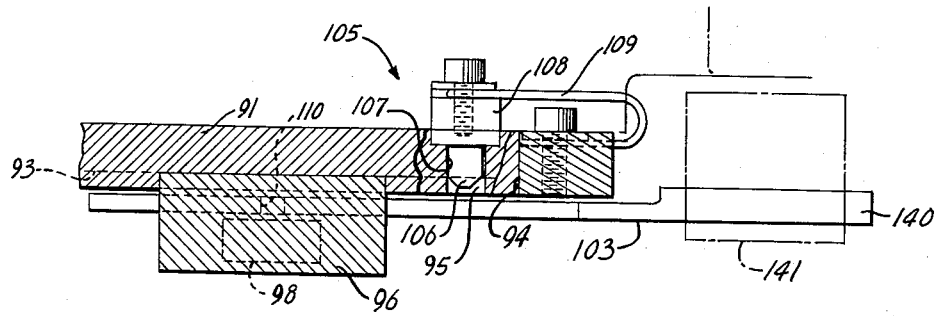
FIG. 8 is a fragmentary top plan view, as from line 8—8 of a spring detent device for work pieces associated with the structure of FIG. 7.

As illustrated in FIGS. 8 and 9, the superstructure 19 has an elevated portion 90 at its inner end which mounts the work presenting and holding provisions, as well as the eccentric and cam actuating linkages therefor; and FIG. 8 of the drawings schematically shows the general layout of the means in question. A flat mounting plate 91 of substantial size is secured by bolts 92 on a flat inner surface of the upright superstructure part 90, and the exposed surface of the plate 91 is formed to provide an L-shaped work chute or guide way 93, including a vertical gravity intake portion 94, and a horizontal, laterally extending discharge portion 95.

The chute 93 opens through the exposed surface of plate 91, and it will be understood that, with the two sections 11 of the machine 10 in mutually facing relation, properly spaced in accordance with the length of work pieces W to be machined, the ends of these pieces are received in the respective mutually facing chute formations 93. They are supplied to the latter by means of an upper trough-like feed device to be described.

Each mounting plate 91 has a fixed upper clamp jaw 96 secured thereto by bolts 97, the jaw 96 presenting a downwardly facing nose or anvil 98 in which an arcuate work engaging seat is formed, and a movable clamp jaw 99 is approached toward and retracted from the anvil 98 by provisions hereinafter described. Jaw 99 is also formed to provide an upwardly facing arcuate work seat.

The fixed work clamping anvil 98 is, as illustrated in FIG. 11 (see also FIG. 6), provided with a small vertical bore receiving a small stripper pin 100 which is biased downwardly by a coil spring 101 to insure that work W will be stripped from the fixed jaw 96 upon downward retraction of the movable jaw 99 following the machining operation.

It should be understood at this point that work pieces W are periodically advanced and presented to jaws 96, 99 by a pair of arms 103, one associated with each of the machine units 11, which operate in an oscillatory vertical orbit in the limited space between the movable jaw 99 and the fixed mounting plate 91, as depicted in FIGS. 6 and 11. FIG. 6 shows the arms 103 in a position of minimum spacing of the two machine units.

Figure 7:
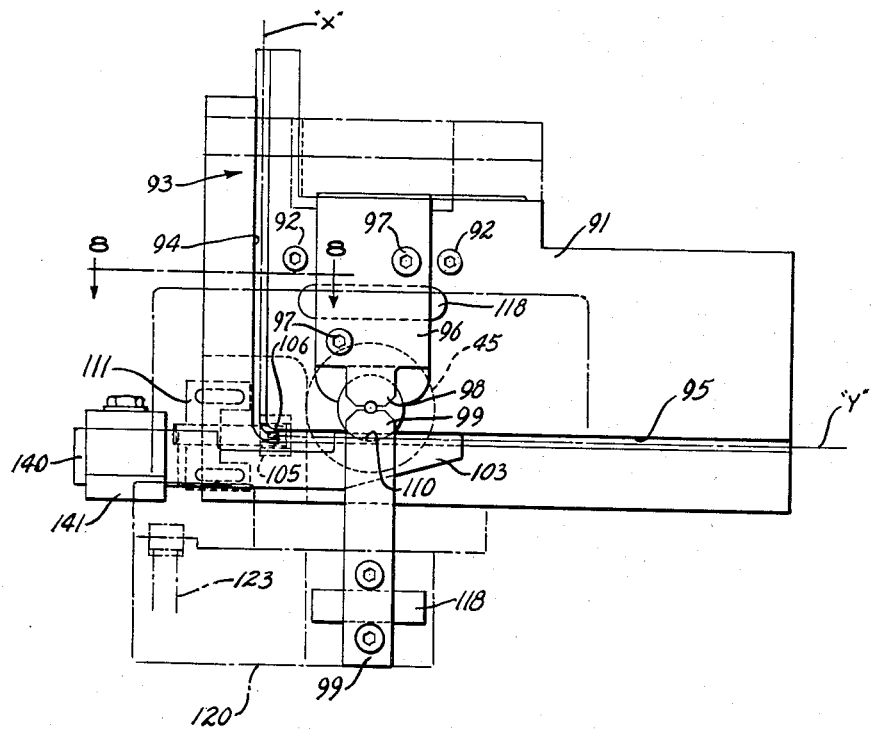
FIG. 7 is a view in end elevation, as from the line 7—7 of FIG. 1, further illustrating in a somewhat schematic way the work presenting and clamping mechanisms, associated operating structure being eliminated for clarity.
Figure 10:
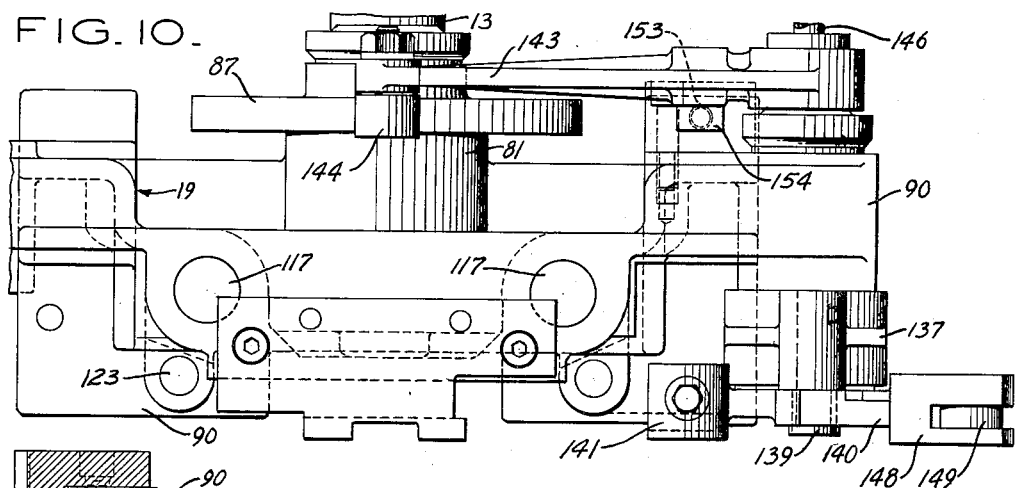
FIG. 10 is a fragmentary top plan view of the structure of FIG. 9.

These work presenting arms pick up the opposite ends of a work piece in a zone immediately adjacent the junction of the vertical and horizontal chute portions 94, 95, respectively, as shown in FIGS. 7 and 9. For the purpose of yieldably holding the bottommost work piece W of a stack in the chute portion 94 until the arm 103 moves into position to engage it and present it above the vertically movable clamping jaw 99, each mounting plate 91 is equipped with a spring type detent device of the type shown in FIG. 8 and generally designated 105. It includes a tapered detent finger 106 acting through a horizontal aperture 107 in the mounting plate 91, just to one side of the chute junction referred to above. This finger is carried by a block 108 attached to an arm of a leaf spring 109 which is secured to the opposite face of plate 91. Accordingly, the lowermost work piece W will be yieldably held in place until its end is picked up by the work presenting arm 103 and is moved laterally, i.e., to the left in FIG. 8 and to the right in FIG. 7, engaging the piece and presenting it to the clamping jaw 99 (in the position of the arm 103 which is shown in FIGS. 7 and 8). For positive engagement with the work piece the arm 103 has an upwardly facing arcuate seat 110 in which the end of the piece rests.

In accordance with the invention, suitable provision is made to vary the width of the vertical gravity portion 94 of the chute 93, in order to accommodate work pieces of different diameter without either undue snugness or looseness. To this general end a schematically illustrated, adjustable throat piece 111 may be applied to the mounting plate 91 to regulate the width of the throat entry to the yieldable detent device 105. Specific provisions of different types for the purpose will suggest themselves to those skilled in the art, and the horizontal chute portion 95 may be upwardly unrestricted. It is also within the intent of the invention to provide work presenting arms 103 having work seats 110 of different sizes to accommodate different sizes of work, and the same is true of the arcuate work seats of the fixed and movable clamping jaws 98, 99.

Referring now to FIGS. 9 through 12, in conjunction with the more or less schematic FIG. 7, the lower, vertically movable work clamping jaw 99 is secured by bolts or studs 114 in a rear boss portion formation 115 of an upper movable clamp jaw carrying head 116. This head is guided for vertical movement by a pair of upright cylindrical slide columns or rods 117 appropriately mounted at their tops and bottoms in the elevated part 90 of superstructure 19. In this connection, a pair of keys 118 are employed to secure proper registering alignment and increased stability of the fixed and movable jaws 96 and 99, the keys 118 being received in machined, mutually facing slots of the respective jaws 99, 96, and of the movable head 116 and fixed mounting plate 91.

Also guided for vertical sliding movement on the guide columns 117 is a lower actuating head 120 for the jaw carrying head 115. The head 120 urges the jaw head 115 resiliently upwardly, through the interposed agency of a pair of spaced coil springs 112, to yieldably clamp the work piece between clamping jaw 98 and anvil 99. The springs 112 surround upright guide pins 123 which are fixedly mounted on the lower head 120, as shown in FIG. 9, as by adjustable threaded engagement with projecting lugs 124 on the latter, and they are slidably received in bosses 125 of the upper jaw carrying head 115.

Thus, an upward movement of the clamp jaw 99 from the inoperative, retracted position shown in dotted line in FIG. 9, to the solid line, work clamping position, is a resiliently cushioned one under sufficient force to prevent rotation of a work piece W in the respective sets of anvils 98 and jaws 99, but not to mar or distort the piece.

Referring now to FIGS. 9 and 11, the eccentric 80 fixed on main drive shaft 13 is surrounded by the eccentric ring 85, through the agency of which the eccentric causes vertical movements of the lower actuator head 120, the upper jaw carrying head 116 and the movable jaw 90, as well as a component of an irregular oscillatory movement of the work presenting arm 103. The eccentric ring has a radial crank projection 127 which receives a pivot pin 128 journaled in the actuator head 120. A retainer disk 129 is secured by screws 130 to the face of eccentric 80 and overlaps the running joint between eccentric 80 and ring 85. The latter also carries a second radial crank projection 132 at 90° to the crank 127, on which a turnbuckle-adjusted connecting rod or stem 133 is pivoted by a pin 134.

Superstructure part 90 carries a pair of reinforced lateral mounting webs 135, each affording a boss 136, upon one of which a vertically disposed oscillatory rocker 137 is medially pivoted. Connecting stem 133 is pivotally connected at 138 to the lower end of rocker 137, and the upper end of the rocker is pivotally mounted by a pin 139 to an intermediate point on an oscillatory work support member 140. Work presenting arms 103 of different sizes, as previously described, are adapted to be releasably clamped in an end clamp head 141 on the member 140, for different diameters of work.

Reference has been made to the cam 87 keyed on main drive shaft 13 in axially spaced relation to the rear of eccentric 80, as illustrated in FIG. 11. This cam controls the movement of a rocker lever 143 (FIG. 9), the inner end of which carries a cam follower roller 144 riding the periphery of cam 87.

Rocker lever 143 is medially pivoted by a pin 146 on the lateral boss 136 of the superstructure, as shown in FIG. 12, on an axis coinciding with that of the pivotal axis of rocker 137, and an outer extension arm 147 is fixed on the end of pivot pin 146 opposite lever 143. The work support member 140, which is pivoted on rocker 137 at pin 139, also has an outer extension 148, and a connecting rod 149, adjustable by means of the agency of a turnbuckle device 150, is pivotally connected at its ends to the respective extensions 147, 148.

Rocker lever 143 is resiliently urged against cam 137 by means of a spring device 152, as shown in FIG. 9, including an elongated depending rod 153 pivoted on lever 143 at 154 and extending through a fixed abutment 155. A coil compression spring 156 surrounds rod 153, acting between the abutment 155 and a stop nut 157 adjustably threaded on the lower end of rod 153 to urge the cam follower lever 143 counterclockwise and against cam 87.

When shaft 13 is rotatively driven, the effect is therefore to cause the eccentric 80 to reciprocate the work heads 116, 120 vertically, and also to impart an irregular oscillatory rocking motion to the support head 141 and the work presenting arm 103 carried by the latter. The last named motion is accomplished through the conjoint operation of the eccentric ring 85 in oscillating rocker 137 about its pivot at 146, and of the cam 87 in simultaneously rocking the follower lever 143 about the same axis at pivot pin 146. Rocker 137 swings reversely in a generally horizontal arc and rocker lever 143 swings reversely in a generally vertical direction, as indicated by the arrows in FIG. 9; and these motions are transmitted to the work support head 141 through the linkage comprising the follower lever extension 147, the connecting rod 149 and the extension 140 of oscillatory support member 148.

The resultant motion of the work presenting arm 103 is suggested in solid and dotted lines in FIG. 9, being indicated in dotted line in a swinging approach upwardly toward a work piece W horizontally restrained by spring detent 105, thence into the position shown in solid line, in which a work piece resting in arm seat 110 is in vertical alignment with the movable clamp jaw 99. Jaw 99 then advances upwardly, lifts the work piece out of the seat, and yieldably clamps it against the fixed clamp anvil 98.

Reference should now be had to FIGS. 13 and 14, in conjunction with FIGS. 1 and 3, in regard to a gravity trough device by which work pieces W are fed into the respective opposed guide chutes 93. Each of the machine sections or units 11 is equipped with a laterally extending mounting bracket 159 which is bolted to a side of the elevated superstructure part 90; and an inclined trough member 160 is supported on each bracket. The trough includes a flat, inwardly inclined base plate 161 having an upstanding confining wall 162 thereon, which wall inclines laterally in a receiving mouth portion 163 to a work registering discharge portion 164, it being understood that the wall portions 164 of the respective opposed troughs are parallel and, when properly adjusted, line up the work pieces W in an orderly series. The forward lip of the trough is disposed to discharge into the top of the chute way 93 of mounting plate 91, adjustment in this direction being provided for, as will be described.

The trough member 160 carries a depending flange 165 which is pivotally mounted at 166 on a base 167, and the base is supported on bracket 159 for adjustment as to height by screws 168 and lock nuts. The angularity of the trough can be adjusted by swinging it about the pivot 166, then clamping a bolt or screw 169 carried by base 167 and extending through an arcuate slot 170 of the flange 165 to hold the adjustment. Longitudinal adjustment of the trough 160 in the direction of its inclination is by means of similar bolt and slot provisions 171; while lateral adjustment of the trough 160 is effected in like way at 172, as indicated in FIG. 14.

The operation of the machine 10 should be apparent from the above description. Once set up in a proper spacing of its opposed units 11, in a proper adjustment of the sleeve and cam coupling units 57, with properly selected work presenting arms 103 and corresponding work guide provisions, the motors 22 drive the respective tool spindles 26 of said opposed units 11, and the common drive shaft 13 is powered through speed change mechanism 20. The machine thereafter operates automatically, requiring the sole attention that its chute trough means 160 be kept supplied with work pieces W.

Shaft 13 rotates eccentrics 80 to move eccentric rings 85 in an orbit which moves jaw actuator heads 120 vertically and oscillates rockers 137 in the horizontal sense. Cams 87 are similarly driven to rock levers 143, and the eccentric and cam derived rocking motions are each compounded by and transmitted through linkages 147, 149 and 148 to the oscillatory supports 140 and work presenting arms 103.

They swing inwardly as shown in dotted and solid line in FIG. 9, each picking up an end of a work piece W (previously restrained by the yieldable detents 105) and advance this piece to position directly above the movable jaws 99. As this occurs the eccentric rings 85 shift the jaws 99 upwardly to lift the work piece off the arms 103 and clamp them against the fixed jaw anvils 98. This is under the cushion afforded by the springs 123 which operatively connect the lower, eccentric-actuated heads 120 and the upper, jaw carrying heads 116.

By the time the work piece W has been thus clamped the opposed tool chucks are advancing towards the work ends, as timed and powered in their strokes by the rotary cams 31. Cams 31 act through follower yoke 77 to reciprocate the guide rods 61, 62 on which the members 58 are adjustably clamped and the drive pins 70, releasably engageable in the drive blocks 56, drive the sleeves 41 axially through those blocks. Spindles 26 move axially with the sleeves to engage tools 47 for turning operations on the work piece, then retract the same, whereupon the jaws 95, 99 disengage from the work and the arms 103 rearwardly resume their orbit for another cycle, in which the previously machined work piece is advanced for discharge along the chute way 95.

A machine is provided which operates at high output capacity to simultaneously deburr opposite ends of tubular work pieces, or to chamfer or otherwise machine similar or related objects. It incorporates practically identical units with practically identical provisions for the feeding, positioning and clamping of work pieces, as well as for the advance and retraction of turning tools in relation to the clamped work.

A single source of power drives the movable work positioning and clamping elements of both machine units; while the turning tools are individually powered by appropriate motor means, the advance and retraction of the tools being nevertheless powered through the same line of drive as operates the work positioning and clamping devices.

The invention in particular affords a novel eccentric and cam actuated linkage for imparting a special irregular oscillatory motion to the work presenting arms, whereby they pick up a work piece and advance it in an oscillatory way into alignment with work clamping devices, without interference with other parts closely associated therewith in the physical sense. The machine is very compact.

As a further specific improvement, releasable provisions, including those for decoupling the tool spindle from its drive means, as well as for the removal and replacement of work handling parts to accommodate work pieces of different size, make the machine a very versatile one, quickly set up and changed over for different operations.

What I claim as my invention is:

1. A machine for performing turning or like rotative operations on opposite ends of elongated work pieces, comprising a pair of like opposed machine units each provided with a rotative and axially shiftable tool carrying spindle, means on each of said units for advancing and retracting said spindles relative to the ends of a work piece, relatively movable clamp means engageable with a work piece to hold the same for said operations, means for presenting work pieces for the operation of said units thereon, means for actuating said work presenting means and said movable clamp means, including oscillatory means for moving said work presenting means in a non-rectilinear and relatively irregular path in a plane transverse of the length of said work pieces into position for clamping engagement by said clamp means, and a common drive shaft for said machine units drivingly connected to said respective advancing and retracting means and to said actuating means.

2. A machine for performing turning or like rotative operations on opposite ends of elongated work pieces, comprising a pair of like opposed machine units each provided with a rotative and axially shiftable tool carrying spindle, means on each of said units for advancing and retracting said spindles relative to the ends of a work piece, relatively movable clamp means on said respective units engageable with the ends of a work piece to hold the same for said operations, means on said respective machine units for presenting work pieces for the operation of said units thereon by engaging opposite ends of said pieces, means for actuating said respective work presenting means and movable clamp means, including oscillatory means for moving said work presenting means in a non-rectilinear and relatively irregular path in a plane transverse of the length of said work pieces into position for clamping engagement by said clamp means, said oscillatory means including a linkage operatively engaging said work presenting means at different points to move the same in said last named path and a common drive shaft for said machine units drivingly connected to said respective advancing and retracting means and to said actuating means.

3. A machine for performing turning or like rotative operations on opposite ends of elongated work pieces, comprising a pair of like opposed machine units each provided with a rotative and axially shiftable tool carrying spindle, means on each of said units for advancing and retracting said spindles relative to the ends of a work piece, relatively movable clamp means on said respective units engageable with the ends of a work piece to hold the same for said operations, means on said respective machine units for presenting work pieces for the operation of said units thereon, comprising work supporting arms mounted on said respective units for oscillatory movement in a non-rectilinear and relatively irregular path in a vertical plane between positions to pick up a work piece by engaging opposite ends of said pieces and an operative delivery position, means for actuating said respective work presenting arms and movable clamp means, and a common drive shaft for said machine units drivingly connected to said respective advancing and retracting means and to said actuating means.

4. A machine for performing turning or like rotative operations on opposite ends of elongated work pieces, comprising a pair of like opposed machine units each provided with a rotative and axially shiftable tool carrying spindle, means on each of said units for advancing and retracting said spindles relative to the ends of a work piece, relatively movable clamp means on said respective units engageable with the ends of a work piece to hold the same for said operations, means on said respective machine units for presenting work pieces for the operation of said units thereon, comprising work supporting arms mounted on said respective units for oscillatory movement between positions to pick up work pieces, by engaging opposite ends of said pieces, and to present the same to said clamp means, and means for coordinately actuating said respective work presenting arms and movable clamp means in non-rectilinear and relatively irregular reversing strokes of the former and rectilinear reversing strokes of the latter relative to said work pieces, said actuating means including a linkage operatively connected to each arm at different points thereon to impart said relatively irregular stroke thereto.

5. A machine for performing turning or like rotative operations on opposite ends of elongated work pieces, comprising a pair of like opposed machine units each provided with a rotative and axially shiftable tool carrying spindle, means on each of said units for advancing and retracting said spindles relative to the ends of a work piece, relatively movable clamp means on said respective units engageable with the ends of a work piece to hold the same for said operations, means on said respective machine units for presenting work pieces for the operation of said units thereon, comprising work supporting arms mounted on said respective units for oscillatory movement between positions to pick up work pieces, by engaging opposite ends of said pieces, and to present the same to said clamp means, means for coordinately actuating said respective work presenting arms and movable clamp means and movable clamp means in non-rectilinear and relatively irregular reversing strokes of the former and rectilinear reversing strokes of the latter relative to said work pieces, said actuating means including a linkage operatively connected to each arm at different points thereon to impart said relatively irregular stroke thereto, and a common drive shaft for said machine units drivingly connected to said respective advancing and retracting means and to said actuating means.

6. A machine tool unit comprising a tool carrying spindle having means mounting the same for rotative and axially reciprocatory motion toward and away from a work piece to be operated on, means for imparting said motion to said spindle, work clamping jaws mounted on said unit for relative reciprocatory movement in a path through the axis of said spindle to engage and hold a work piece in axial alignment with the latter, a work supporting arm mounted on said unit for irregular oscillatory movement in a longitudinal, non-rectilinear path having a final component in the direction transverse of the relative jaw movement, a feed device for said work pieces from which said work supporting arm successively removes work pieces and moves in said last named path to present the same in the path of relative movement of said jaws, and a common mechanism for effecting said relative movement of said jaws and said oscillatory movement of said arm.

7. A machine tool unit comprising a tool carrying spindle having means mounting the same for rotative and axially reciprocatory motion toward and away from a work piece to be operated on, means for imparting said motion to said spindle, work clamping jaws mounted on said unit for relative reciprocatory movement in a path through the axis of said spindle to engage and hold a work piece in axial alignment with the latter, a work supporting arm mounted on said unit for irregular oscillatory movement in a longitudinal, non-rectilinear path having a final component in the direction transverse of the relative jaw movement, a feed device for said work pieces from which said work supporting arm successively removes work pieces and moves in said last named path to present the same in the path of relative movement of said jaws, and a common mechanism for effecting said relative movement of said jaws and said oscillatory movement of said arm, comprising a pair of rotative actuators coaxially mounted for rotation on said unit, an operating connection between one of said actuators and at least one of said jaws to effect said relative movement of the latter, and a further operating connection between both of said actuators and said work supporting and presenting arm to impart a compound stroke of the latter resulting in said irregular oscillatory movement.

8. A machine tool unit comprising a tool carrying spindle having means mounting the same for rotative and axially reciprocatory motion toward and away from a work piece to be operated on, means for imparting said motion to said spindle, work clamping jaws mounted on said unit for relative reciprocatory movement in a path through the axis of said spindle to engage and hold a work piece in axial alignment with the latter, a work supporting arm mounted on said unit for irregular oscillatory movement in a longitudinal, non-rectilinear path having a final component in the direction transverse of the relative jaw movement, a feed device for said work pieces from which said work supporting arm successively removes work pieces and moves in said last named path to present the same in the path of relative movement of said jaws, and a common mechanism for effecting said relative movement of said jaws and said oscillatory movement of said arm, comprising an eccentric and a cam coaxially mounted for rotation on said unit, an eccentric ring surrounding and moved by said eccentric, a cam follower member operated by said cam, an operating connection between said eccentric ring and at least one of said jaws to effect said relative movement of the latter, and a linkage including means operatively connecting said eccentric and said cam with said work supporting and presenting arm to impart a compound stroke of the latter resulting in said irregular oscillatory movement.

9. A machine tool unit comprising a tool carrying spindle having means mounting the same for rotative and axially reciprocatory motion toward and away from a work piece to be operated on, rotative means for imparting said motion to said spindle, work clamping jaws mounted on said unit for relative reciprocatory movement in a path through the axis of said spindle to engage and hold a work piece in axial alignment with the latter, a work supporting arm mounted on said unit for irregular oscillatory movement in a longitudinal, non-rectilinear path having a final component in the direction transverse of the relative jaw movement, a feed device for said work pieces from which said work supporting arm successively removes work pieces and moves in said last named path to present the same in the path of relative movement of said jaws, a common mechanism for effecting said relative movement of said jaws and said oscillatory movement of said arm, and a common drive shaft drivingly engaged with said spindle motion imparting means and with said common mechanism.

10. A machine tool unit comprising a tool carrying spindle having means mounting the same for rotative and axially reciprocatory motion toward and away from a work piece to be operated on, rotative means for imparting said motion to said spindle, work clamping jaws mounted on said unit for relative reciprocatory movement in a path through the axis of said spindle to engage and hold a work piece in axial alignment with the latter, a work supporting arm mounted on said unit for irregular oscillatory movement in a longitudinal, non-rectilinear path having a final component in the direction transverse of the relative jaw movement, a feed device for said work pieces from which said work supporting arm successively removes work pieces and moves in said last named path to present the same in the path of relative movement of said jaws, a common mechanism for effecting said relative movement of said jaws and said oscillatory movement of said arm, comprising a pair of rotative actuators coaxially mounted for rotation on said unit, an operating connection between one of said actuators and at least one of said jaws to effect said relative movement of the latter, and a further operating connection between both of said actuators and said work supporting and presenting arm to impart a compound stroke of the latter resulting in said irregular oscillatory movement, and a common drive shaft drivingly engaged with said spindle motion imparting means and with said common mechanism.

11. A machine tool unit comprising a tool carrying spindle having means mounting the same for rotative and axially reciprocatory motion toward and away from a work piece to be operated on, rotative means for imparting said motion to said spindle, work clamping jaws mounted on said unit for relative reciprocatory movement in a path through the axis of said spindle to engage and hold a work piece in axial alignment with the latter, a work supporting arm mounted on said unit for irregular oscillatory movement in a longitudinal, non-rectilinear path having a final component in the direction transverse of the relative jaw movement, a feed device for said work pieces from which said work supporting arm successively removes work pieces and moves in said last named path to present the same in the path of relative movement of said jaws, a common mechanism for effecting said relative movement of said jaws and said oscillatory movement of said arm, comprising an eccentric and a cam coaxially mounted for rotation of said unit, an eccentric ring surrounding and moved by said eccentric, a cam follower member operated by said cam, an operating connection between said eccentric ring and at least one of said jaws to effect said relative movement of the latter, and a linkage including means operatively connecting said eccentric and said cam with said work supporting and presenting arm to impart a compound stroke of the latter resulting in said irregular oscillatory movement, and a common drive shaft drivingly engaged with said spindle motion imparting means and with said common mechanism.

12. A machine for performing turning or like rotative operations on opposite ends of elongated work pieces, comprising a pair of like opposed machine units each provided with a rotative and axially shiftable tool carrying spindle, means on each of said units for advancing and retracting said spindles relative to the ends of a work piece, relatively movable clamp means engageable with a work piece to hold the same for said operations, means for presenting work pieces for the operation of said units thereon, means for actuating said work presenting means and said movable clamp means, including oscillatory means for moving said work presenting means in a non-rectilinear and relatively irregular path in a plane transverse of the length of said work pieces into position for clamping engagement by said clamp means, and driving means for said machine units drivingly connected to said respective advancing and retracting means and to said actuating means.

13. A machine for performing turning or like rotative operations on opposite ends of elongated work pieces, comprising a pair of like opposed machine units each provided with a rotative and axially shiftable tool carrying spindle, means on each of said units for advancing and retracting said spindles relative to the ends of a work piece, relatively movable clamp means engageable with a work piece to hold the same for said operations, means for presenting work pieces for the operation of said units thereon, means for actuating said work presenting means and said movable clamp means, including oscillatory means for moving said work presenting means in a non-rectilinear and relatively irregular path in a plane transverse of the length of said work pieces into position for clamping engagement by said clamp means, and driving means for said machine units drivingly connected to said respective advancing and retracting means and to said actuating means, said clamp means comprising relatively movable jaws and means to engage the work piece therebetween under resilient pressure.

14. A machine for performing turning or like rotative operations on opposite ends of elongated work pieces, comprising a pair of like opposed machine units each provided with a rotative and axially shiftable tool carrying spindle, means on each of said units for advancing and retracting said spindles relative to the ends of a work piece, relatively movable clamp means on said respective units engageable with a work piece to hold the same for said operations, means on said respective machine units for presenting work pieces for the operation of said units thereon by engaging opposite ends of said pieces, means for actuating said respective work presenting means and movable clamp means, said oscillatory means including a linkage operatively engaging said work presenting means at different points to move the same in said last named path, and driving means for said machine units drivingly connected to said respective advancing and retracting means and to said actuating means.

15. A machine for performing turning or like rotative operations on opposite ends of elongated work pieces, comprising a pair of like opposed machine units each provided with a rotative and axially shiftable tool carrying spindle, means on each of said units for advancing and retracting said spindles relative to the ends of a work piece, relatively movable clamp means on said respective units engageable with a work piece to hold the same for said operations, means on said respective machine units for presenting work pieces for the operation of said units thereon by engaging opposite ends of said pieces, means for actuating said respective work presenting means and movable clamp means, said oscillatory means including a linkage operatively engaging said work presenting means at different points to move the same in said last named path, and driving means for said machine units drivingly connected to said respective advancing and retracting means and to said actuating means, said clamp means comprising relatively movable jaws and means to engage the work piece therebetween under resilient pressure.

References Cited in the file of this patent

UNITED STATES PATENTS

| | | |
|---|---|---|
| 908,816 | Thomas | Jan. 5, 1909 |
| 2,327,404 | Curtis | Aug. 24, 1943 |
| 2,411,110 | Pruitt | Nov. 12, 1946 |
| 2,539,723 | Branch | Jan. 30, 1951 |
| 2,622,488 | Payne | Dec. 23, 1952 |
| 2,645,979 | Haesler | July 21, 1953 |
| 2,929,298 | Hill | Mar. 22, 1960 |

FOREIGN PATENTS

| | | |
|---|---|---|
| 625,218 | Germany | Feb. 6, 1936 |